United States Patent Office 3,424,544
Patented Jan. 28, 1969

3,424,544
PROCESS FOR THE COLORATION OF CELLULOSIC TEXTILE MATERIALS WITH REACTIVE PHTHALOCYANINE DYESTUFFS AND THE DYES THEREFOR
James Wardleworth and Victor David Poole, Manchester, England, assignors to Imperial Chemical Industries Limited, London, England, a corporation of Great Britain
No Drawing. Filed Dec. 9, 1957, Ser. No. 701,346
Claims priority, application Great Britain, Dec. 14, 1956, 38,195/56
U.S. Cl. 8—54.2      13 Claims
Int. Cl. C07d 27/76; C09b 47/04

This invention relates to new phthalocyanine dyestuffs and their use and more particularly it relates to water-soluble sulphonamido-phthalocyanine dyestuffs which dye cellulosic textile materials in greenish blue shades of high fastness to light and to wet treatments and to the process for their application.

It is known to manufacture water-soluble sulphonamido-phthalocyanine dyestuffs by reacting a chlorosulphonated phthalocyanine with an aqueous solution or suspension of an amine. However, the previously described dyestuffs so obtained give shades on cellulosic textile materials which have, in general, an undesirably low fastness to wet treatments, especially to washing.

It is also known to dye cotton with phthalocyanine dyestuffs containing isothiouronium groups in their molecular structures in the presence of an aliphatic carboxylic acid by adding gradually to the dyebath an alkali metal salt of a weak acid and finally completing the fixation of the dystuff by treating the cotton in sodium carbonate solution. However, these dyestuffs containing isothiouronium groups may only usefully be applied to cotton in this manner as they are lacking in affinity for other cellulosic fibres, especially viscose rayon.

We have now found a new class of water-soluble sulphonamido-phthalocyanine dyestuffs which, when applied in conjunction with a treatment with an acid binding agent, have good affinity for cellulosic textile materials in general, the resulting greenish-blue shades having extremely good wash fastness and high light fastness.

Acording to the present invention, therefore, there are provided, as new dyestuffs, derivatives of copper phthalocyanine which contain, attached to the benz rings of the phthalocyanine nucleus, at least one sulphonic acid group and at least one grouping of the formula —$SO_2$—R wherein the symbol —R stands for a grouping of the formula —$NHCH_2CH_2Cl$, —$NH.CH_2CH_2Br$, or —$NH.CH_2CH_2OSO_3H$ or derivatives thereof wherein the methylene groups may be substituted by lower alkyl groups.

The preferred dyestuffs are those in which the sulphonic acid groups and groups of the said formula are attached in the 3'-positions of the phthalocyanine nucleus.

According to a further feature of the invention there is provided a process for the manufacture of the new dyestuffs which comprises interacting an aqueous suspension of a copper phthalocyanine poly-sulphonchloride with an amine of the formula H—R where the symbol —R has the significance given above, in such manner that the dyestuff obtained contains at least one sulphonic acid group, and preferably at least two sulphonic acid groups, attached to the phthalocyanine nucleus.

The copper phthalocyanine poly-sulphonchlorides used as starting materials may be obtained as described in U.S. specification No. 2,219,330, preferably by treating copper phthalocyanine or a copper phthalocyanine containing one or more sulphonic acid groups with chlorosulphonic acid substantially free from other acid halides.

It is believed that these starting materials already contain sulphonic acid groups, since many of them are readily soluble in aqueous solutions of trialkylamines.

It is to be understood that the term copper phthalocyanine poly-sulphonchloride used above is meant to include starting materials which contain sulphonic acid groups.

There may also be used in the process of the invention, copper phthalocyanine poly-sulphonchlorides substantially free from sulphonic acid groups. These may be obtained by treating copper phthalocyanine or the corresponding copper phthalocyanine polysulphonic acids with chlorosulphonic acid in the presence of an acid halide such as thionyl chloride, sulphuryl chloride, phosphorus pentachloride, phosphorus oxychloride and phosphorus trichloride.

As examples of amines which may be used in the process of the invention there may be mentioned beta-chloroethylamine, beta-chloroisobutylamine, beta-bromo-n-butylamine, beta-bromoethylamine, beta-aminoethyl hydrogen sulphate and beta-chloroisopropylamine.

The proportion of amine used may be varied to obtain different proportions of amide groups and sulphonic acid groups in the molecule, but it is essential that at least one molecular proportion of amine be used for each molecular proportion of copper phthalocyanine poly-sulphonchloride. When the copper phthalocyanine used as starting material already contains sulphonic acid groups, an excess of amine may be used over the amount necessary to react completely with the sulphonchloride groups present. When the copper phthalocyanine used is substantially free from sulphonic acid groups, the proportion of amine added should be insufficient to cause complete conversion of all the sulphonchloride groups to sulphonamide groups. Any sulphonchloride groups which do not react with the amine may, if desired, by hydrolysed by carrying out the process of the invention in aqueous medium or by treating the copper phthalocyanine sulphonchloride-sulphonamide in a cold aqueous solution of pyridine, for example at a temperature below 30° C. The halogen acid liberated during the reaction may be neutralised by adding an acid-binding agent for example, by using an excess of the amine, but preferably by adding a salt of a weak acid such as sodium carbonate or sodium bicarbonate.

The new dyestuffs which contain sulphon-beta-sulphatoalkylamide groups may also be obtained by interaction of a sulphating agent, for example chlorosulphonic acid, sulphur trioxide, and complexes thereof with tertiary amines, preferably in a tertiary amine or amide as reaction medium, with the corresponding copper phthalocyanines containing sulphonic acid groups and sulphon-beta-hydroxyalkylamide groups.

Although dyeing and printing with the new dyestuffs may be carried out by the commonly used processes, they are preferably applied to cellulosic textile materials for example cotton, linen and viscose rayon, in conjunction with a treatment with an acid-binding agent.

As acid-binding agent there may be used for example a caustic alkali, such as caustic soda or caustic potash, or an alkali metal salt of a weak acid such as sodium carbonate or bicarbonate, trisodium phosphate or sodium metasilicate.

The colouration of the cellulosic textile material may be carried out by both dyeing techniques and printing techniques. The treatment with the acid-binding agent may be carried out prior to, simultaneously with, or after the treatment with the dyestuff.

When the acid-binding agent is applied simultaneously with the dyestuff it may conveniently be dissolved in the dyestuff solution or the printing paste containing the dyestuff.

The dyestuff solution, whether acid-binding agent is present or not, may contain commonly used dyebath adjuvants, for example sodium chloride, sodium sulphate, sodium alginate, urea and water-soluble alkyl ethers of cellulose.

The printing paste, whether acid-binding agent is present or not, may contain commonly used adjuvants for example urea and thickening agents for example methyl cellulose, starch and locust bean gum, but it is preferred to use, as thickening agent, an alginate for example sodium alginate.

Dyeing in the presence of an acid-binding agent is preferably carried out at an elevated temperature, since fixation of the dyestuff on the textile material usually increases as the temperature of the dyestuff solution is raised.

Dyestuff applied to the textile material from a printing paste containing acid-binding agent or by padding from an aqueous solution containing an acid-binding agent may usually be fixed by simply drying the textile material, for example in a heated chamber at temperatures from 40° C. to 70° C. or by passing the printed textile material over a series of steam-heated cylinders. In some cases, however, improved fixation is obtained by steaming the printed textile material for a short period of time, for example 10 minutes or less.

When the acid-binding agent is applied in a separate step before or after the treatment with the dyestuff it is preferably applied by treating the textile material with an aqueous solution of the acid-binding agent, for example by a padding technique. The aqueous solutions of acid-binding agents thus used may also contain commonly used dyebath adjuvants of the kind mentioned above.

Both the solution of the acid-binding agent and the dyestuff solution containing the dyestuff may be applied at temperatures lying over a wide range, conveniently at a temperature lying between room temperature and the boiling point of the solutions. It is preferred to carry out the two treatments at atmospheric temperature. The textile material may, if desired, be dried between the two treatments, and after the application of the dyestuff solution or after the application of the acid-binding agent, whichever is the later step, the textile material may be heated for example by steaming, by passage through a heated chamber or a molten metal bath or by passage over heated drying cylinders.

When, in carrying out a printing process, a steaming step is included, other types of dyestuff may also be applied alongside the dyestuffs defined above, and the process using an aftertreatment with acid-binding agent may be advantageously used for printing with the dyestuffs defined above, together with dyestuffs which on heating or steaming evolve acidic vapours or are fixed by treatment with acids or acid vapours. Such dyestuffs include, for example, the leuco-sulphuric esters of vat dyestuffs and dyestuffs obtained by the reaction of colouring matters containing halogenomethyl groups with tertiary amines or thioureas.

The fastness to washing or subsequent wet processing of the colourations produced by the process of our invention is in general improved by a scouring treatment in for example a hot aqueous solution of soap and sodium carbonate, followed by rinsing in hot water prior to drying.

The new dyestuffs may also be used to colour natural proteins such as wool, silk and leather, and synthetic polyamides and polyacrylonitriles to give greenish-blue shades having a high fastness to washing by treating these materials in a weakly alkaline, neutral or acid solution of the dyestuff. It is preferred to carry out the dyeing of wool in the presence of a cationic surface-active agent such as stearamido-methyl pyridinium chloride, cetyl pyridinium bromide or cetyl trimethylammonium bromide, and preferably also in the presence of a non-ionic surface-active agent such as the polycondensation products of ethylene oxide with fatty alcohols, alkyl phenols and long chain alkylamines.

The new dyestuffs behave as "reactive" dyestuffs, with these fibres, that is to say, the new dyestuffs form a chemical link with the molecules forming the textile materials when applied by the methods described above.

The coloured textile materials so obtained form yet a further feature of the invention.

The invention is illustrated but not limited by the following examples in which parts and percentages are by weight.

EXAMPLE 1

50 parts of the sodium salt of copper phthalocyanine-tetra-4-sulphonic acid are dissolved in 475 parts of chlorosulphonic acid at 20° C. and the solution is stirred and heated to 115° C. and maintained at a temperature between 115° C. and 120° C. for 4 hours. The resulting solution is cooled and drowned carefully into ice-water, maintaining the temperature below 2° C. by addition of ice. The precipitated sulphonchloride is filtered off at a temperature below 5° C., drained well and the residue on the filter is suspended in 1,000 parts of ice-water and neutralised to litmus by addition of sodium bicarbonate. 33.6 parts of sodium bicarbonate are added, and then there is added a solution prepared by dissolving 12.8 parts of 2-chloroethylamine hydrochloride and 9.25 parts of sodium bicarbonate in 200 parts of water. The mixture is stirred for 16 hours, allowing the temperature to rise to 20° C., then filtered and the residue on the filter is washed free from alkali with 5% brine and dried at 40° C.

The product so obtained dissolves in warm water to give a bright blue solution. It contains about 1.1 beta-chloroethylsulphamyl groups and 2.9 sulphonic acid groups for each copper phthalocyanine nucleus.

EXAMPLE 2

The process described in Example 1 is repeated except that the 2-chloroethylamine hydrochloride is replaced by 13 parts (2 molecular proportions) of beta-chloroisopropylamine hydrochloride. The product obtained contains about 1.2 beta-chloroisopropylsulphamyl groups and 2.8 sulphonic acid groups for each copper phthalocyanine nucleus.

EXAMPLE 3

46.5 parts of the potassium salt of copper phthalocyanine-tri-4-sulphonic acid are dissolved in 475 parts of chlorosulphonic acid at 20° C. and the solution is stirred and heated to 115° C. and maintained at a temperature between 115° C. and 120° C. for 4 hours. The resulting solution is cooled and drowned carefully into ice-water, maintaining the temperature below 2° C. by addition of ice. The precipitated sulphonchloride is filtered off at a temperature below 5° C., drained well and the residue on the filter is suspended in 1,000 parts of ice-water and neutralised to litmus by addition of sodium bicarbonate. 25.2 parts of sodium bicarbonate are added, and then there is added a solution prepared by dissolving 8.7 parts (1.5 molecular proportions) of 2-chloroethylamine hydrochloride and 6.3 parts of sodium bicarbonate in 150 parts of water.

The mixture is stirred for 16 hours, allowing the temperature to rise to 20° C., then filtered and the residue on the filter is washed free from alkali with 5% brine and dried at 40° C.

The product so obtained dissolves in warm water to give a bright blue solution. It contains about 1.5 sulphonic acid groups and 1.5 beta-chloroethylsulphamyl groups for each copper phthalocyanine nucleus.

EXAMPLE 4

50 parts of the sodium salt of copper phthalocyanine-tetra-4-sulphonic acid are chlorosulphonated as described in Example 1 and the sulphonchloride is suspended in 1,000 parts of ice-water and neutralised to litmus by addition of sodium bicarbonate. 33.6 parts of sodium bicarbonate are added, followed by 6.2 parts (2 molecular proportions) of ethanolamine. The mixture is stirred for 18 hours, whilst slowly raising the temperature to 20° C. Then 100 parts of salt are added followed by 20 parts of hydrochloric acid, and the precipitate is filtered off and dried at 100° C.

50 parts of the complex of triethylamine and sulphur trioxide are stirred at 110° C. until molten, and 10 parts of the above product are added. The mixture is stirred at between 110 and 115° C. for 2 hours and finally at 125° C. for 30 minutes. It is then poured into 500 parts of water and sodium carbonate is added until the precipitate dissolves.

100 parts of sodium chloride are added to the solution, and acetone is added until the precipitated dyestuff coagulates. The precipitate is filtered off, washed with 75% aqueous acetone and dried at 35° C.

The product dissolves in water to give a bright turquoise blue solution.

Similar products are obtained if the sulphonchloride from copper phthalocyanine tri-4'-sulphonic acid obtained as described in Example 3 is reacted with 1.5 molecular proportions of ethanolamine or 2-aminopropan-1-ol and the products are then sulphated.

EXAMPLE 5

50 parts of the sodium salt of copper phthalocyanine tetra-4'-sulphonic acid are treated with chlorosulphonic acid as described in Example 1 and to the neutralised suspension in water there are added 33.6 parts of sodium bicarbonate and a solution of 14.1 parts of 2-aminoethyl hydrogen sulphate and 8.4 parts of sodium bicarbonate in 50 parts of water.

The mixture is stirred for 16 hours whilst slowly raising the temperature to 20° C. 1,000 parts of potassium acetate are added and the precipitate so obtained is filtered off, washed with 45% aqueous potassium acetate solution, then with ethanol and dried. The product is similar to those obtained as described in the previous example, as also are the products obtained if the sulphonchloride obtained from the potassium salt of copper phthalocyanine-tri-4'-sulphonic acid is reacted with 10.6 parts of 2-aminoethyl hydrogen sulphate in the presence of sodium bicarbonate.

EXAMPLE 6

The process described in Example 1 is repeated but using 20.5 parts of 2-bromoethylamine hydrobromide in place of the 2-chloroethylamine hydrochloride. The product obtained is similar to that obtained in Example 1.

EXAMPLE 7

57.6 parts of copper phthalocyanine are dissolved in 600 parts of chlorosulphonic acid and the solution is heated at from 135 to 140° C. for 4 hours. The reaction mixture is cooled to 25° C. carefully drowned, with stirring, into ice-water, maintaining the temperature below 2° C. by addition of ice, and the precipitated sulphonchloride is filtered off, drained well, and suspended in 2,000 parts of ice-water.

The mixture is made neutral to Congo Red by adding sodium bicarbonate and a further 67.2 parts of sodium bicarbonate are added. There is then added a solution of 23.2 parts of 2-chloroethylamine hydrochloride (2 molecular proportions) and 16.8 parts of sodium bicarbonate in 400 parts of water. The mixture is stirred for 16 hours, allowing the temperature to rise to between 20 and 25° C.

200 parts of sodium chloride are then added, and the blue precipitate is filtered off, washed free from alkali with 10% brine, drained well and dried at 60° C.

The product so obtained dissolves in warm water to give bright turquoise blue solutions.

It contains about 1.8 beta-chloroethylsulphamyl groups and 2.2 sulphonic acid groups for each copper phthalocyanine molecule.

Similar products are obtained by using 1.5 to 3.0 molecular proportions of 2-chloroethylamine hydrochloride or 2-bromoethylamine hydrobromide in the above process.

EXAMPLE 8

50 parts of copper phthalocyanine are dissolved in 387 parts of chlorosulphonic acid at 20° C. and the solution is stirred and heated to 115° C. and maintained at this temperature for 4 hours. The resulting solution is cooled and drowned carefully into ice-water, maintaining the temperature below 0° C. by addition of ice. The precipitated sulphonchloride is filtered off at a temperature below 5° C., drained well and the residue on the filter is suspended in 900 parts of ice-water and neutralised to litmus by addition of sodium bicarbonate. 26.6 parts of ethanolamine are added, and the mixture is stirred for 18 hours, allowing the temperature to rise to 20° C. Then 175 parts of salt are added followed by 20 parts of hydrochloric acid, and the precipitate is filtered off, washed with 2.5% brine and dried at 70° C.

125 parts of the complex of triethylamine and sulphur trioxide are stirred at 110° C. until molten, and 25 parts of the above sulphonethanolamide are then added. The mixture is stirred at between 110 and 115° C. for 2 hours and finally at 125° C. for ½ hour. It is then poured into 800 parts of water and sodium carbonate is added until the precipitate dissolves.

200 parts of sodium chloride are added to the solution and ethanol is added until the dyestuff is precipitated. The precipitate is filtered off, washed with 75% aqueous ethanol and dried at 35° C.

The product so obtained is suspended in 600 parts of 17.5% aqueous sodium chloride solution and stirred for 60 minutes. The mixture is filtered and the product of the filter is drained well and dried.

The product so obtained is a blue powder which readily dissolves in water to give a blue solution. It contains about 1.1 sulphonic acid groups and 1.2 sulphatoethylsulphamyl groups for each copper phthalocyanine nucleus.

Similar products are obtained if the sulphonchloride obtained as described in Example 7 is reacted with 2 or 3 molecular proportions of ethanolamine or 2-aminopropan-1-ol and the resultant hydroxyalkylsulphamyl products sulphated; or if either of the sulphonchlorides obtained as described in Examples 7 and 8 is reacted with 2, 4 or 8 molecular proportions of ethyl hydrogen sulphate.

EXAMPLE 9

If the sulphonchloride obtained as described in Example 8 is reacted with from 1.5 to 3.0 molecular proportions of beta-chloroethylamine hydrochloride, similar products to those of Example 7 are obtained. Similarly beta-chloro-iso-propylamine hydrochloride may replace the beta-chloroethylamine hydrochloride used in Example 7 to give similar products.

Hereafter follow suitable dyeing and printing recipes whereby any of the dyestuffs of the above examples may be caused to react with the textile material used in the recipe to give bright greenish-blue shades very fast to washing.

Recipes for cellulosic textiles such as cotton, viscose rayon and linen (1) A printing paste is made up by mixing together 3 parts of the dyestuff, 30 parts of urea, 31 parts of water, 35 parts of 5% aqueous sodium alginate solution and 1 part of sodium bicarbonate. The printing paste is applied to cotton fabric by roller and the fabric is dried and then steamed for 5 minutes. It is then rinsed in water, boiled in a dilute aqueous solution of detergent for 5 minutes, rinsed again in water and dried.

(2) Cotton cloth is padded through an aqueous solution containing 1% of the dyestuff and 0.2% of sodium triisopropyl naphthalene sulphonate, at a temperature of 50° C. The cloth is squeezed so that it retains its own weight of solution, and it is dried at 50° C.

The dried cloth is then padded through an aqueous solution containing 1% of caustic soda and 30% of sodium chloride and it is then steamed for 1 minute.

It is then washed successively in water, a 4% aqueous solution of sodium bicarbonate, water, boiling 0.3% aqueous solution of soap and water and then it is dried.

(3) Bleached plain weave cotton fabric is padded at room temperature with an aqueous solution containing 2% of the dyestuff, 1% of sodium bicarbonate, 1% of sodium sulphate and 0.2% of a wetting agent consisting of the polycondensate of ethylene oxide with an alkyl phenol. The fabric is squeezed in a padding mangle set to allow take-up by the cloth of an equal weight of solution, then dried in a hot flue drier at 112° C. and rinsed, washed and dried as described in the above recipes.

(4) 100 parts of viscose rayon yarn are added to a solution at 50° C. containing 1 part of the dyestuff in 3000 parts of water and 90 parts of sodium chloride are added. The solution is heated to 90° C. and after 30 minutes, a solution of 5 parts of caustic soda in 50 parts of water is added. The treatment is continued for 60 minutes and then the yarn is rinsed, washed and dried as described in the previous recipes.

Recipes for protein and synthetic fibres (1) 2 parts of dyestuff are dissolved in a little water and added to 4000 parts of water at 40° C. containing 4 parts of 85% formic acid. 100 parts of nylon are added to the dyebath and the dyebath is heated to 95° C. and treatment is continued at this temperature for 60 minutes. The nylon is then removed and rinsed, washed and dried as described in the previous recipes.

Silk, wool, polyacrylonitrile and polyvinyl alcohol fibres may be dyed in the same manner, or by starting with a neutral dyebath and adding acid (such as formic or sulphuric acid) during the treatment at 95° C. the wool exhibits a fleck effect similar to that obtained from a yarn which has been coloured by mélange printing.

(2) Silk and polyvinyl alcohol may also be dyed by treatment in a dyebath containing about 0.03% by weight of the dyebath of dyestuff and about 3% by weight of the dyebath of salt at 50° C. for 30 minutes and then adding about 0.2% by weight of the dyebath of sodium carbonate and continuing the treatment for 60 minutes.

(3) 100 parts of wool yarn are added to a dyebath at 40° C. containing 2 parts of the dyestuff, 1 part of cetyl trimethylammonium bromide, 2 parts of a polycondensate of ethylene oxide with a fatty alcohol and 3 parts of ammonium acetate in 2,000 parts of water. The dyebath is heated to 95° C. during 30 minutes and the treatment is continued at this temperature for 45 minutes. A level dyeing is obtained. A similar result is obtained if the ammonium acetate is replaced by 2 parts of 30% aqueous acetic acid.

(4) 100 parts of chrome tanned suede leather, previously wet back in warm aqueous ammonia, are floated in 60,000 parts of water at 55° C. containing 5,000 parts of common salt. 5 parts of dyestuff are dissolved in cold water, and added and dyeing is continued for 15 minutes. 0.5 part of sodium carbonate are dissolved in water and added and dyeing is continued for a further 30 minutes. The leather is then washed in cold running water and fat-liquored in the usual way.

(5) A print paste having the following composition:

| | Parts |
|---|---|
| Dyestuff | 3 |
| Urea | 15 |
| Water | 47 |
| Sodium alginate (5% solution) | 35 |
| | 100 | is applied to chlorinated wool fabric by means of a roller printing machine. The prints are dried and steamed for 15 minutes at atmospheric pressure, rinsed in cold water, washed for 5 minutes in dilute soap solution at 50° C. and dried.

(6) The print paste used in the preceding recipe, but containing in addition 1 part of sodium bicarbonate is applied to natural unweighted silk. The prints are then dried, steamed, rinsed, washed and dried as described in the previous recipe.

(7) A print paste having the following composition:

| | Parts |
|---|---|
| Dyestuff | 2 |
| Urea | 10 |
| Water | 27 |
| Gum tragacanth (6% solution) | 60 |
| Ammonium sulphate | 1 |
| | 100 | is applied to a knitted polyacrylonitrile fabric by a screen printing technique. The prints are dried, steamed at atmospheric pressure for 30 minutes, rinsed in cold water, washed at 60° C. in dilute soap solution for 5 minutes, rinsed and dried.

(8) A print paste having the following composition:

| | Parts |
|---|---|
| Dyestuff | 2 |
| Thiourea | 5 |
| Water | 32 |
| Gum tragacanth (6% solution) | 60 |
| Ammonium oxalate | 1 |
| | 100 | is applied to continuous filament nylon twill fabric by means of a roller printing machine. The printed fabric is dried, steamed and washed as described in recipe 5.

What we claim is:

1. Water-soluble dyestuffs of the phthalocyanine series being derivatives of copper phthalocyanine which contain, attached to the benzene rings of the phthalocyanine nucleus, at least one sulphonic acid group and at least one grouping of the formula —SO$_2$—R wherein the symbol —R stands for a grouping selected from the class consisting of —NHCH$_2$CH$_2$Cl, —NH.CH$_2$CH$_2$Br, and

—NH.CH$_2$CH$_2$OSO$_3$H and derivatives thereof wherein a methylene group is substituted by a lower alkyl group.

2. Dyestuffs as claimed in claim 1 which contain at least 2 sulphonic acid groups.

3. Dyestuffs as claimed in claim 1 wherein the sulphonic acid groups and the groups of said formula are attached in the 3'-positions of the phthalocyanine nucleus.

4. Process for the manufacture of the dyestuffs of the phthalocyanine series claimed in claim 1 which comprises interacting an aqueous suspension of a copper phthalocyanine poly-sulphonchloride with an amine of the formula NH$_2$.CH$_2$.CH$_2$X wherein X is selected from the group consisting of chlorine, bromine, and sulphato, and said amines where a methylene group is substituted by a lower alkyl group, to obtain a dyestuff containing at least one sulphonic acid group attached to the phthalocyanine nucleus.

5. Process as claimed in claim 4 wherein said phthalocyanine poly-sulphonchloride used as starting material contains at least one sulphonic acid group.

6. Process as claimed in claim 4 wherein said phthalocyanine poly-sulphonchloride used as starting material is obtained by treating a copper phthalocyanine with chlorosulphonic acid substantially free from other acid halides.

7. Process for the manufacture of water-soluble dyestuffs of the phthalocyanine series which comprises treating with a sulphating agent, derivatives of copper phthalocyanine which contain at least one sulphonic acid group and at least one sulphon-beta-hydroxyalkylamide group attached to the phthalocyanine nucleus.

8. The process of claim 6, wherein said copper phthalocyanine contains sulphonic acid groups.

9. Process for the coloration of a cellulosic textile material which comprises applying to these materials a water-soluble phthalocyanine dyestuff containing at least one group of the formula —$SO_2NHC_2H_4X$ where X is taken from the group consisting of bromine, chlorine, and sulfoxy and then heating said treated material in the presence of an acid-binding agent.

10. Process for the coloration of a cellulosic textile material which comprises applying to the material a water-soluble phthalocyanine dyestuff containing at least one group of the formula —$SO_2NHC_2H_4OSO_3H$ and then heating said treated material in the presence of an acid-binding agent.

11. A copper phthalocyanine bearing as sole substituents two to three sulfonic acid groups and one to two sulfon-beta-sulfatoethylamide groups wherein the total number of said substituents equals four.

12. Textile materials selected from the class consisting of cotton, linen, viscose rayon, wool, silk, leather, polyamide and polyacrylonitrile which have been colored with a water-soluble dyestuff of the phthalocyanine series which contains, attached to the benzene rings of the phthalocyanine nucleus, at least one sulphonic acid group and at least one grouping of the formula —$SO_2$—R wherein the symbol —R stands for a grouping selected from the class consisting of —$NHCH_2CH_2Cl$, —$NH.CH_2CH_2Br$, and —$NH.CH_2CH_2OSO_3H$ and derivatives thereof where a methylene group is substituted by a lower alkyl group.

13. Cotton textile materials which have been colored by treatment with an acid-binding agent and with a water-soluble dyestuff of the phthalocyanine series which contains, attached to the benzene rings of the phthalocyanine nucleus, at least one sulphonic acid group and at least one grouping of the formula —$SO_2$—R wherein the symbol —R stands for a grouping selected from the class consisting of —$NHCH_2CH_2Cl$, —$NH.CH_2CH_2Br$, and

—$NH.CH_2CH_2OSO_3H$ and derivatives thereof where a methylene group is substituted by a lower alkyl group.

References Cited

UNITED STATES PATENTS

| 2,285,359 | 6/1942 | Rosch et al. | 260—314.5 |
| 2,300,572 | 11/1942 | Hoyer et al. | 260—314.5 |
| 2,683,643 | 7/1954 | Baumann et al. | 8—1 |
| 2,863,875 | 12/1958 | Bienert et al. | 260—314.5 |

FOREIGN PATENTS

| 1,117,562 | 5/1956 | France. |

OTHER REFERENCES

Sisley: Amer. Dyestuff Reporter, July 11, 1949, pp. 513–521.

Venkataraman: Synthetic Dyes, vol. 2, 1952, Academic Press, New York, pp. 1134–1137.

J. TRAVIS BROWN, *Primary Examiner.*

T. J. HERBERT, JR., *Assistant Examiner.*

U.S. Cl. X.R.

260—314.5